J. S. WADDINGTON.
TREATMENT OF SEWAGE.
APPLICATION FILED AUG. 19, 1911.
1,019,933.
Patented Mar. 12, 1912.
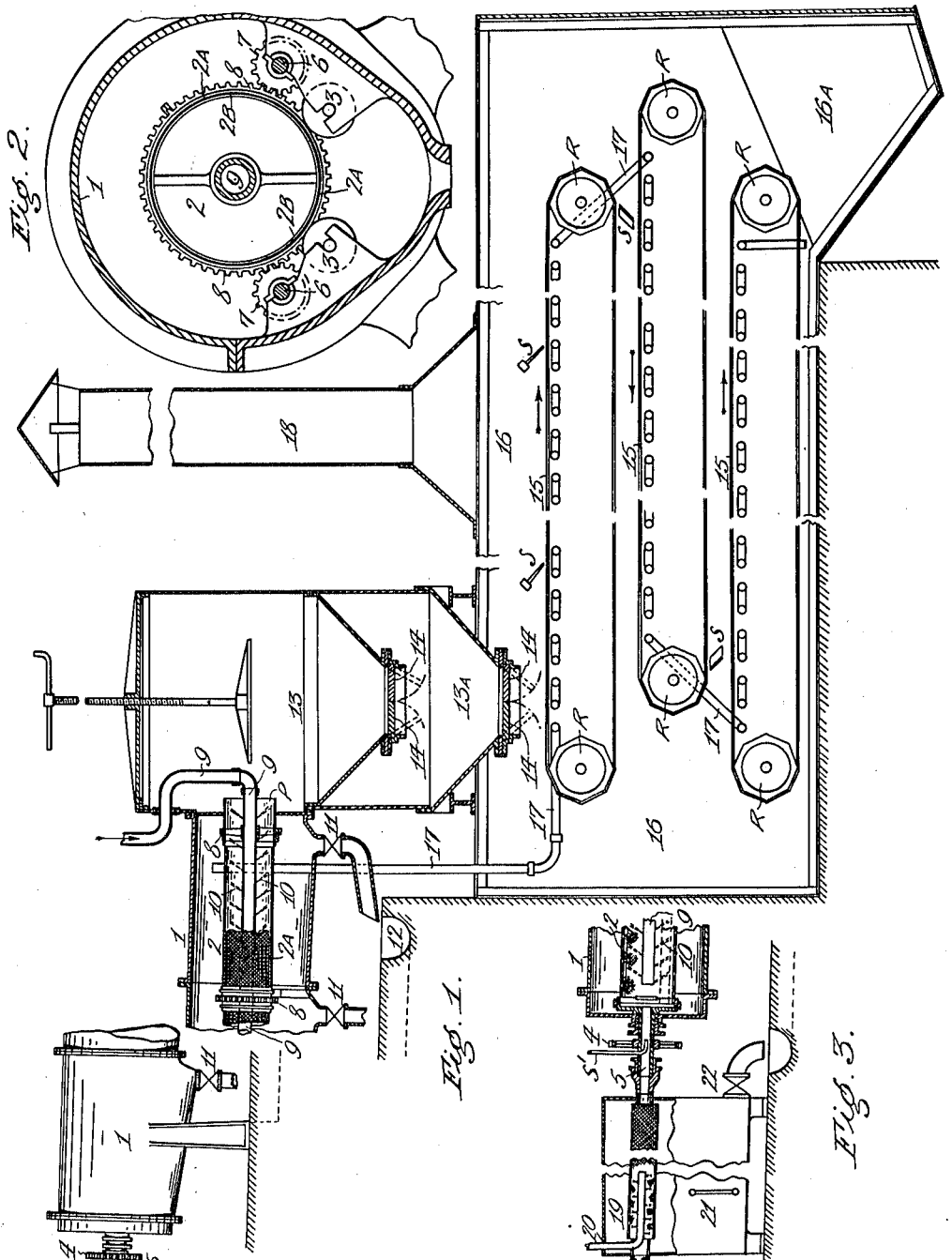
Inventor
Joe S. Waddington
By Spear Middleton Donaldson & Spear
Attys.

UNITED STATES PATENT OFFICE.

JOE SMITH WADDINGTON, OF BRADFORD, ENGLAND.

TREATMENT OF SEWAGE.

1,019,933.  Specification of Letters Patent.  Patented Mar. 12, 1912.

Application filed August 19, 1911. Serial No. 644,968.

*To all whom it may concern:*

Be it known that I, JOE SMITH WADDINGTON, a subject of the King of Great Britain and Ireland, and resident of 1 Powell road, Bolton Woods, Bradford, in the county of York, England, have invented a certain new and useful Improvement in and Relating to the Treatment of Sewage, of which the following is a specification.

The object of this invention is to so treat semi-liquid sewage such as the mud removed from precipitation and like settling tanks, in a manner that the liquid and grease carried by the sewage mud, may be more effectually extracted therefrom, and the residue further dried before leaving the apparatus.

In describing my invention in detail, reference is made to the accompanying sheet of drawings, in which—

Figure 1 represents a longitudinal elevation partly in section of an apparatus suitable for carrying out my invention. A portion of the apparatus is at an inclination and is shown broken, the feeding and discharging ends being illustrated. Fig. 2 is an enlarged transverse sectional view through the casing and revolving circular cage, and Fig. 3 is a longitudinal sectional elevation of one end of the apparatus drawn to a smaller scale, showing how some of the water may be extracted from the semi-liquid sewage before entering the revolving circular cage.

In carrying out the invention, a long casing 1 is employed and fixed at an inclination; and within said casing is mounted a circular cage 2, supported at each end, and by rollers 3 placed at convenient distances apart. The circular cage 2 may be rotated by a spur wheel 4, secured on the hollow inlet shaft 5, or extending within the casing 1, shafts 6 may be mounted at the same inclination as the circular cage, and upon said shafts are fixed spur pinions 7 gearing with wheels 8 secured to the exterior of circular cage 2. Rotary motion to the inclined shafts 6 may be imparted in any convenient and suitable manner; or like motion may be imparted to the spur wheel 4, when said wheel is the driving medium of circular cage 2. The hollow shaft 5 is at the inlet end to circular cage 2, and the circumference of said cage may be formed of perforated sheet metal plates 2$^A$, or a circular wire screen may be utilized. In either case, the cage is internally lined with cloth, felt or like porous fabric 2$^B$, adapted to act as a filter.

When the sewage mud does not contain a large percentage of water, it may be fed direct through the hollow shaft 5 to the interior of cage 2, and within this cage is a steam pipe 9, perforated with a number of small holes through which jets 10 of steam are emitted, preferably at an angle somewhat as shown in Figs. 1 and 3. The whole of the jets may impinge in one direction upon the sewage mud as it is traveling through the inclined revolving circular cage 2, or some of the jets may impinge in the opposite direction to that shown, as may be most suitable in practice. The sewage mud on passing through the inclined revolving cage 2, is being continually turned over and exposing different portions of the mud to the action of the steam jets, as it is sliding down the interior of said cage to the outlet P. The heat from the steam liquefies to some extent the grease in the sewage mud, and the force of the jets causes a large portion of the water and grease to be separated from the sewage mud, and forced through the filtering cloth lining 2$^B$ and perforated screen into the interior of casing 1. The water and grease on entering casing 1, gravitate to the lower portion of said casing, and are removed therefrom on opening ordinary sluice valves 11, from which the extracted water and grease are conveyed into a channel 12 or the like, into a suitable receptacle for further filtration and extraction. The residue of the sewage mud is delivered by the revolving cage 2 at P, into a hopper preferably with two compartments as shown at 13 and 13$^A$, Fig. 1, the bottom portion of both compartments being inclined, and provided with swing doors of the ordinary well known type, adapted to be opened and closed in any convenient and suitable manner. As will be understood, on opening swing doors 14 at the bottom of compartment 13, the material deposited therein will fall into the lower compartment 13$^A$, from which by preference, on closing the upper swing doors 14, and opening those at the bottom of the lower compartment, the said material will fall upon the upper section of aprons 15, mounted within a casing 16, said aprons being caused to travel in the direction of the arrows, on the rotation of rollers R driven in any convenient manner.

The sewage mud falls from one apron to the next below, and is deposited into space 16ᴬ, provided at the bottom with swing doors of the ordinary well known type, through which when opened, the partly dried mud falls. The mud deposited on the aprons 15, is spread in a layer on passing under the plates S, and the interior of casing 16 is heated by steam passing through the range of pipes 17, the pipes receiving the steam supply from the interior of casing 1. By this arrangement of steam pipes, the pressure within casing 1 is released and reduced to less than that within cage 2, this difference in pressure allowing the water and grease to pass more freely from the interior to the exterior of said cage, leaving the mud to be deposited in hopper 13 as before described. By heating the interior of casing 16, the mud conveyed through same by the aprons 15, is further dried, the moisture escaping through funnel 18.

When treating precipitated sewage mud containing a large percentage of water, it may be desirable to remove some of the water before the mud enters the revolving cage 2. This may be effected by passing the mud through a screen 19, lined with cloth, felt or the like as before described, and injecting compressed air through pipe 20 into the interior of said screen, and thereby forcing some of the water contained in the mud, through the cloth into cistern 21, from which it may be removed by a sluice valve 22; the air after passing through the felt or the like and screen, escaping from the cistern through a suitable opening. The sewage mud on leaving the interior of screen 19, passes through the hollow inlet shaft 5, to the interior of circular cage 2, where it is heated and agitated in the manner as hereinbefore described.

When treating sewage mud that will not flow readily, in order to assist the flow, a jet of steam or compressed air is admitted through pipe S', Fig. 3, to the interior of hollow shaft 5. As will be obvious, by the force of this jet, the sewage mud will be assisted in its passage through said shaft to the interior of circular cage 2, to be there treated as before described.

What I claim as my invention is:—

1. In a liquid extracting apparatus an inclined casing encircling a revolving cage lined with cloth fabric, combined with a steam pipe having a series of jets adapted to impinge on the mud in said cage, substantially as described.

2. In a liquid extracting apparatus, a cistern inclosing a screen lined with cloth fabric, a compressed air pipe with jets within said screen, a revolving hollow shaft and cloth fabric lined circular cage, in combination with a steam pipe provided with a series of jets arranged within said cage, substantially as described.

In testimony whereof, I have signed my name to this specification in the presence of two subscribing witnesses.

JOE SMITH WADDINGTON.

Witnesses:
 Wm. Illingworth,
 John Gill.